Figure 1:
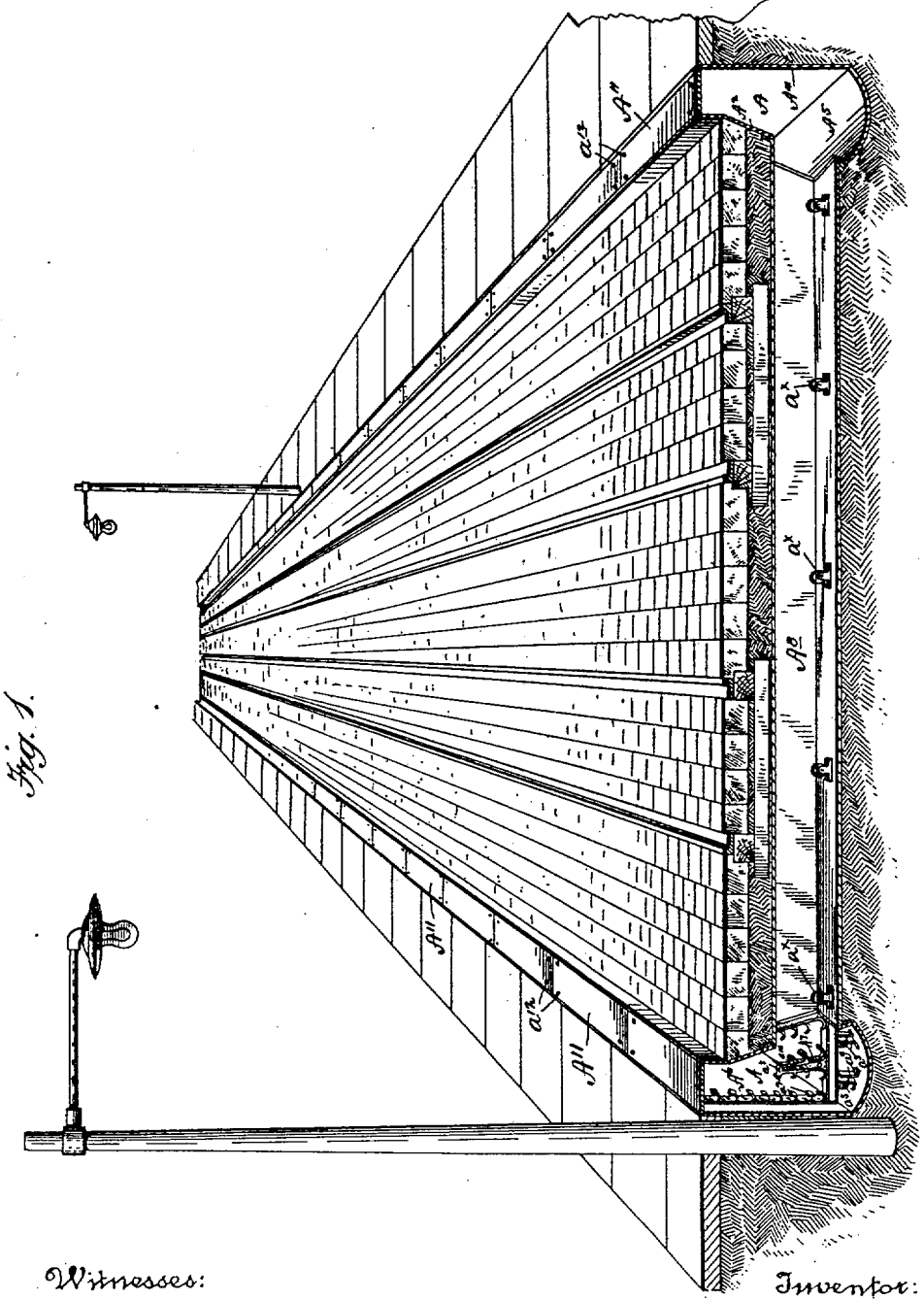

No. 632,973. Patented Sept. 12, 1899.
M. O. SPRING.
CONDUIT FOR ELECTRICAL CONDUCTORS.
(Application filed Dec. 9, 1898.)

(No Model.) 5 Sheets—Sheet 1.

Witnesses:
Franck L. Ourand
R. M. Elliott

Inventor:
M. O. Spring,
by R. S. Dyrenforth,
his attorney.

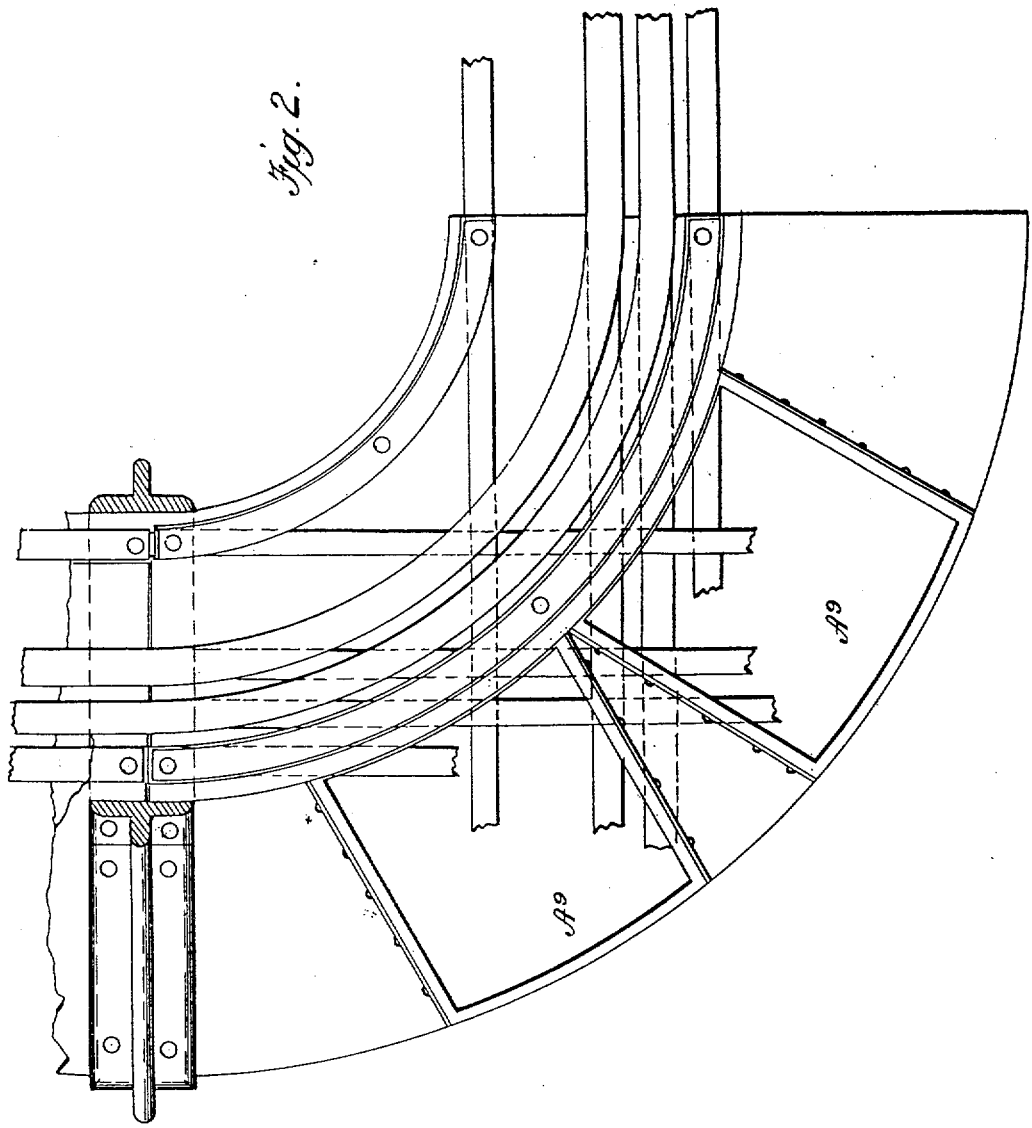

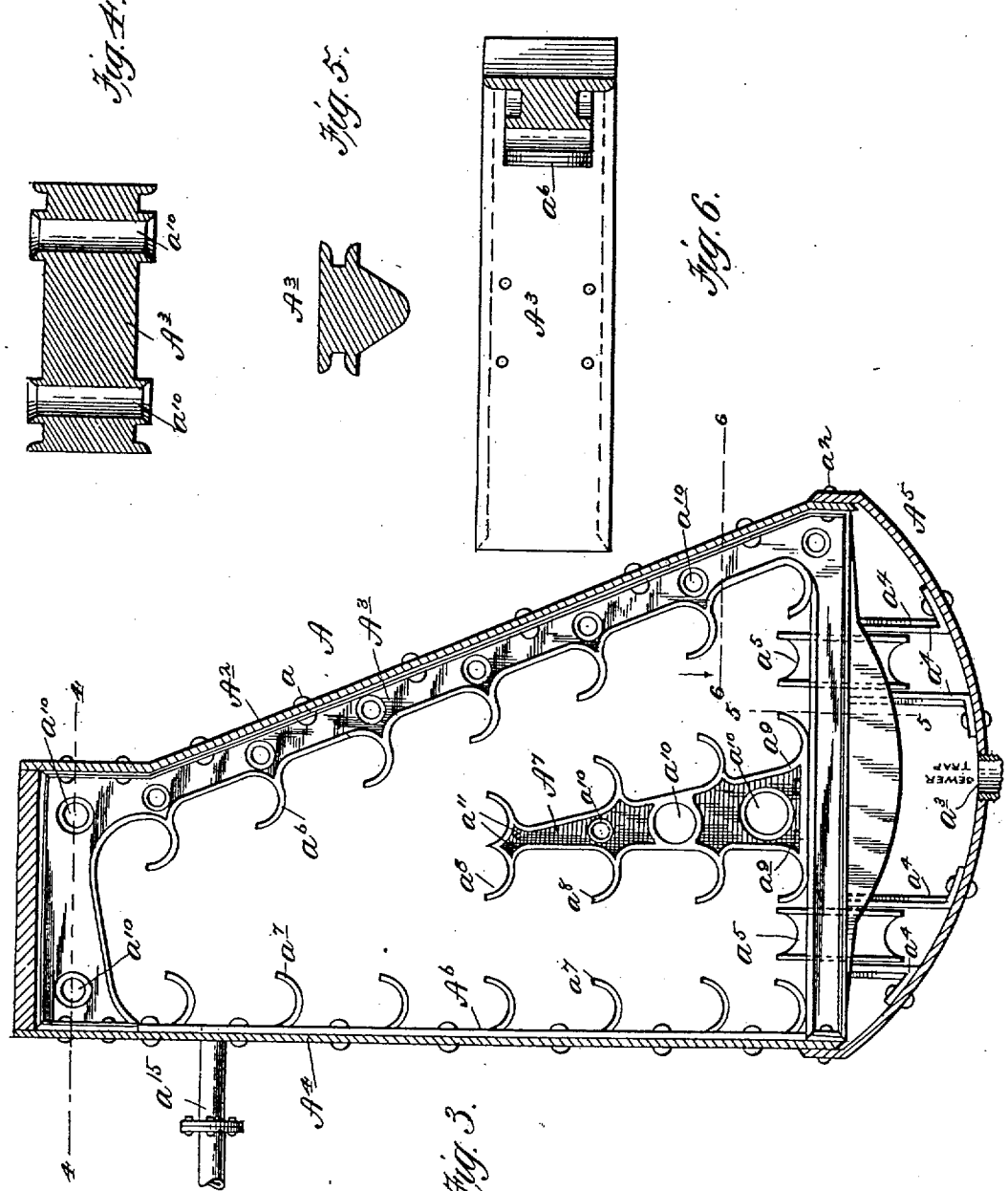

No. 632,973. Patented Sept. 12, 1899.
M. O. SPRING.
CONDUIT FOR ELECTRICAL CONDUCTORS.
(Application filed Dec. 9, 1898.)
(No Model.) 5 Sheets—Sheet 4.
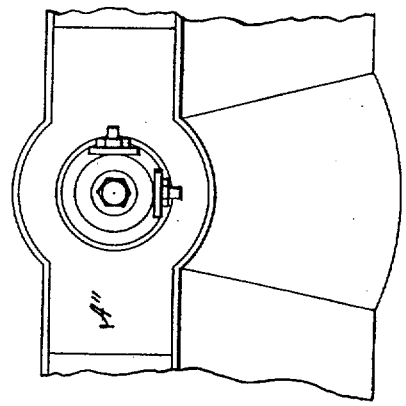
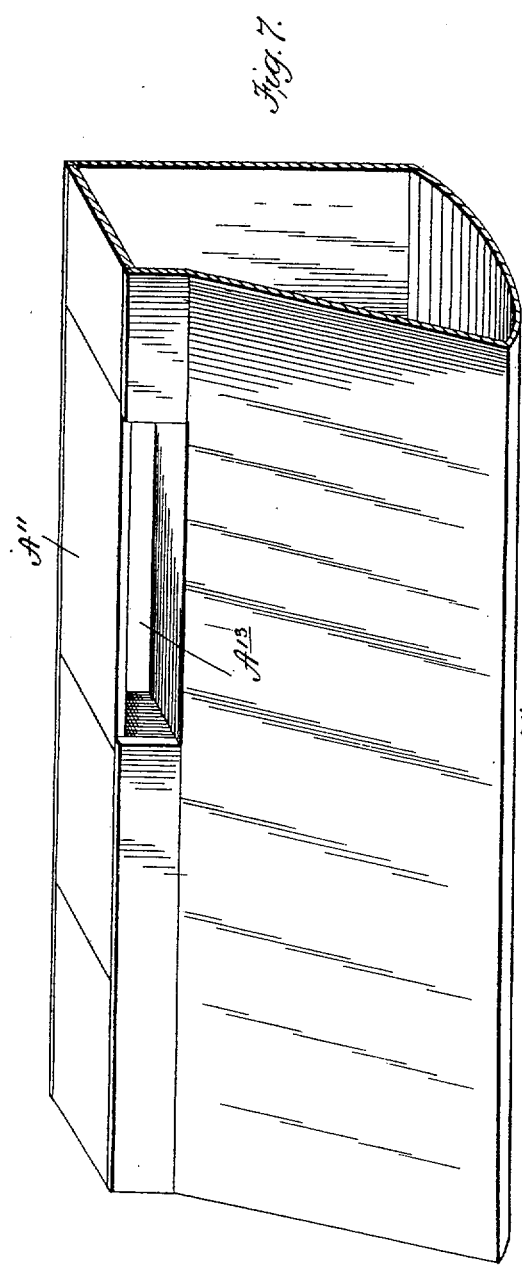
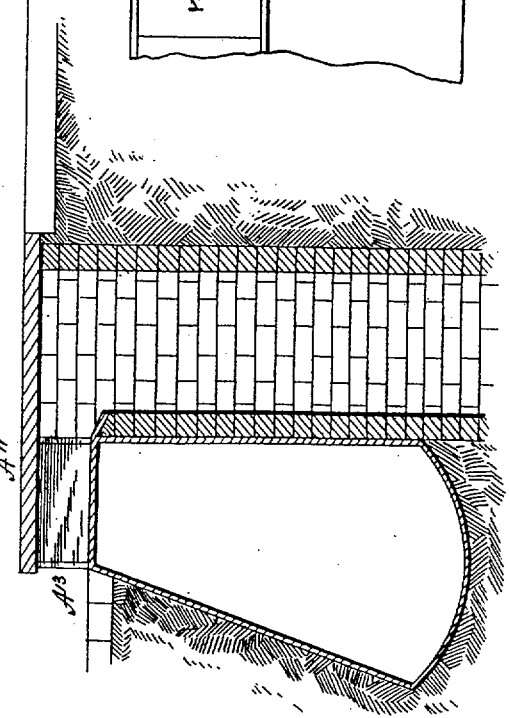
Witnesses:
Franck L. Ourand.
R. M. Elliott.
Inventor:
M. O. Spring,
by his attorney.

No. 632,973. Patented Sept. 12, 1899.
M. O. SPRING.
CONDUIT FOR ELECTRICAL CONDUCTORS.
(Application filed Dec. 9, 1898.)
(No Model.) 5 Sheets—Sheet 5.
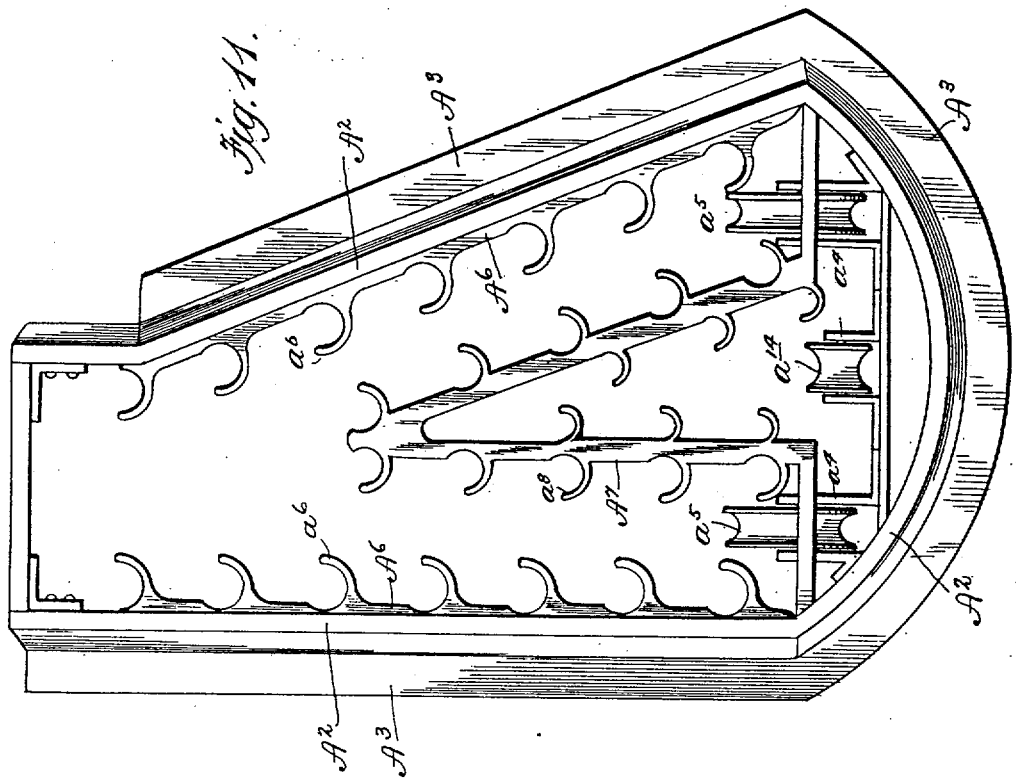
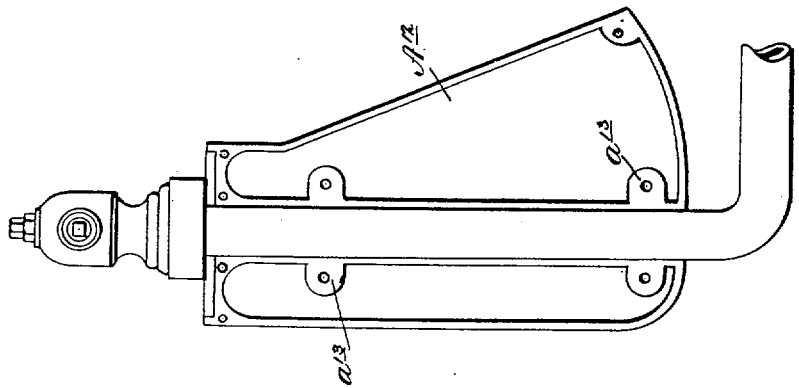
Witnesses:
Franck L. Ourand.
R. M. Elliott.
Inventor:
M. O. Spring
by R. S. Dyrenforth,
his attorney.

UNITED STATES PATENT OFFICE.

MERTIE ONG SPRING, OF PHILADELPHIA, PENNSYLVANIA.

CONDUIT FOR ELECTRICAL CONDUCTORS.

SPECIFICATION forming part of Letters Patent No. 632,973, dated September 12, 1899.

Application filed December 9, 1898. Serial No. 698,743. (No model.)

*To all whom it may concern:*

Be it known that I, MERTIE ONG SPRING, a citizen of the United States, residing at Philadelphia, in the county of Philadelphia and State of Pennsylvania, have invented certain new and useful Improvements in Conduits for Electrical Conductors; and I do hereby declare the following to be a full, clear, and exact description of the invention, such as will enable others skilled in the art to which it appertains to make and use the same.

The object of this invention is to present a conduit for the reception of electrical conductors in which the parts shall be so constructed and arranged as to permit free and ready access for the purpose of arranging the conductors therein or for the purpose of splicing branch conductors in wiring buildings or the like. Furthermore, to present a novel form of conduit shell or casing which by its construction will constitute the curbing and will effectively resist any lateral pressure which would tend to crush or otherwise injure the conduit. Furthermore, to present a novel form of conductor-support in the use of which all available space in the conduit will be utilized for stringing the conductors and readiness and ease in removing or replacing the same will be afforded. Finally, to present means in connection with the conduit by which in laying long and heavy stretches of cable any damage thereto will be entirely obviated and the resistance presented in drawing the cable through the conduit will be reduced to a minimum.

With these objects in view the invention consists in the novel construction and combination of parts of a conduit for electrical conductors, as will be hereinafter fully described and claimed.

In the accompanying drawings, forming a part of the specification, and in which like letters of reference indicate corresponding parts, I have shown a form of embodiment of my invention and a modification thereof, it being understood that other forms thereof may be employed without departing from the spirit of the invention.

In the drawings, Figure 1 is a view in perspective displaying a portion of an ordinary street-railway bed with my improved conduit in position on one side of and beneath the same. Fig. 2 is a view in plan, in the nature of a diagram, displaying the manner in which the conductors may be carried around a corner or may be terminated in manholes or boxings to permit splicing or attachment for the purpose of wiring a building or the like. Fig. 3 is a view in elevation, displaying a preferred form of casting, constituting at once a bracket for supporting the conductors and means for reinforcing the casing. Fig. 4 is a transverse sectional view taken on the line 4 4, Fig. 3. Fig. 5 is a similar view taken on the line 5 5, Fig. 3. Fig. 6 is a similar view, taken on the line 6 6, Fig. 3, and looking in the direction of the arrow. Fig. 7 is a view in perspective, displaying a section of the conduit and showing the manner in which provision is made for allowing proper operation of the sewers either at the street-corners or at intermediate points. Fig. 8 is a transverse sectional view showing more clearly the arrangement of the conduit with relation to the sewer. Fig. 9 is a view in elevation, showing the manner in which the castings are arranged to inclose the supply-pipe leading to a fire-plug. Fig. 10 is a view in plan, showing more clearly the arrangement of the parts shown in Fig. 9, and Fig. 11 is a view in elevation displaying a modified form of casting which may be employed in lieu of that shown in Fig. 3.

Referring to the drawings, A designates the conduit, comprising a shell or casing $A^2$, preferably of boiler-steel, the same being constructed in such manner as to be impermeable to the entrance of water, and castings $A^3$, which subserve the double function of braces for the casing, and by their construction to constitute racks to support the conductors or cables housed within the conduit. These castings are preferably cast of a single piece of metal with a top, bottom, and one side, the side being arranged at an incline to the top and bottom, so that when a casting is in position it will present to the roadway side of the street a solid bearing-surface, which will tend to reinforce the casing and effectively prevent any strain to which the casing may be subjected which would cause either a rupture or crushing of the casing. The upper portion of the casting is of such width as to constitute a curbing, and for this purpose that portion of the casting which will constitute the curbing is straight and merges into the inclined portion referred to.

The casing on the roadway side of the conduit is composed of sheets of boiler-steel riveted to the castings, as shown at $a$, and on the pavement side of the conduit the back of the casing is composed also of sheets of boiler-steel $A^4$, suitably secured at their upper and lower sides to the casting. The bottom $A^5$ of the casing is constructed of sheets of boiler-steel bent to the desired curve and secured at each side by bolts or rivets $a^2$, the center of the bottom being provided with an outlet $a^3$, leading to a sewer, by which means any water which might enter the casing, as from the top, will immediately be carried off. Suitably bolted to the bottom are uprights $a^4$, upon the upper portions of which are journaled grooved sheaves $a^5$, upon which the cables or conductors lie when being drawn through the conduit.

The inner surface of the side of the casting is provided with a plurality of hooks or curved ledges $a^6$, upon which the conductors rest, these hooks or ledges being by preference cast integral with the casting, and to the back of the conduit are secured strips of metal $A^6$, having similar hooks or ledges $a^7$, these hooks or ledges being either struck up out of the strips of metal $A^6$ or secured thereto in any suitable manner. Upon the base of the casting is arranged an upright bracket $A^7$, provided with curved hooks or ledges $a^8$, this bracket being in this instance attached to the base by bolts or rivets $a^9$. In addition to the curved hooks or ledges shown, the casting and bracket $A^7$ are provided with flange-openings $a^{10}$, through which cables may be run, thereby additionally utilizing all space in the conduit. The bracket $A^7$ is further provided near its top with openings $a^{11}$, through which brace-rods may be passed whereby to lock a series of brackets together throughout the conduit, and thus insure rigidity and stability in use.

As clearly shown in Fig. 1, the vertical side of the conduit is next to the pavement and the inclined side next to the roadway, and by this arrangement lateral strain upon the roadway will be met with the requisite resistance by the castings $A^3$ to prevent any crushing in of the conduit. As also shown in this figure, the conduits on the opposite side of the street are connected by a transverse conduit $A^8$, so that by this arrangement ready means will be afforded for crossing the wires from one side of the street to the other to bring the wires into the manholes $A^9$ at the corners of the street, as shown in Fig. 2. As shown in this latter figure, the cables may either terminate in these manholes or may be continued around the corner without interruption, so that a continuous line of cables or wires may be employed, as well as short sections, the latter to present effective means by which the conductors may be tapped for running wires through a building or the like. These manholes, as also the top of the conduit, are closed by plates $A^{11}$, which may be removed at will for the purpose of arranging the wires in the conduit, these plates being by preference held in place over the conduit by bolts $a^{12}$. The transverse conduits $A^8$ are to be furnished with grooved sheaves $a^x$, corresponding to those in the conduits A, to facilitate drawing the cables through the said conduits $A^8$.

Where in the construction of a conduit a fire-plug is met with which cannot be moved back out of the way of the conduit the arrangement shown in Fig. 10 is adopted, consisting of a two-part casting $A^{12}$, as shown in Fig. 9, (only one section being shown in this figure,) the casting being provided with ears $a^{13}$, through which bolts may pass for clamping the sections of the casting securely in place. As shown in Fig. 10, the casting may be rounded on its inner and outer sides, and to these rounded portions the casing of the conduit will be suitably secured.

In Figs. 7 and 8 I have shown the arrangement of the conduit with relation to a sewer. In these figures it will be seen that the top of the casing for a space equal to the length of the sewer-mouth is flush with the street-line to form the mouth $A^{13}$, the top of the mouth being composed of one of the sections of the cover of the top of the conduit. By this novel arrangement in laying a conduit the sewer-traps in the street will not be interfered with.

In Fig. 11 I have illustrated a modified form of casting in which the two sides and bottom of the casting are integral. In this embodiment of my invention, in addition to the sheaves $a^5$ as employed in connection with the structure shown in Fig. 2, I employ a central sheave $a^{14}$, upon which the cables for engaging the hooks on the inner side of the bracket $A^7$ are run.

It is to be understood that I may employ either form of bracket shown in constructing a conduit; but for simplicity in construction and thorough effectiveness in operation the form shown in Fig. 3 is generally preferred.

As a means for effectively housing the branch wires that are led from the cables in the conduit to a house or the like I provide a pipe or pipes $a^{15}$ at suitable intervals along the length of the conduit, and through these the branch wires are run.

In placing the cables within my improved conduit the cables are laid on the sheaves $a^5$ and are drawn through by suitable power until a length has entered a conduit. The cable is then riveted onto any series of alined hooks $a^6$ or $a^7$, as may be preferred. It will be seen that by employing the sheaves in connection with the base of the casing any damage to the insulation of the cables will be entirely obviated. The openings $a^{10}$ in the casting and the bracket may be employed for supporting large cables or small cables, as may be preferred.

The great advantage of the conduit shown is that it is exceedingly simple of construction, will prove of the highest efficiency and durability in use, and can with readiness and ease be repaired in case of damage.

Having thus fully described my invention, what I claim as new, and desire to secure by Letters Patent of the United States, is—

1. A conduit for electrical conductors comprising a shell or casing and castings to which the casing is secured, the castings being provided with hooks or ledges for supporting the cables, substantially as described.

2. A conduit for electrical conductors comprising a shell or casing and castings to which the casing is secured, the castings being provided with hooks or ledges for supporting the cables, and a bracket secured to the base of the casting and provided with hooks or ledges, substantially as described.

3. A conduit for electrical conductors comprising castings provided with inward-projecting hooks or ledges, the casing secured to the castings, and covers adapted to close the top of the casing, substantially as described.

4. A conduit comprising castings provided with hooks or ledges, a front secured along its width to the castings, a back secured at its top and bottom sides to the castings, a curved bottom also secured to the casting, standards secured to the bottom, and sheaves carried by the standards, substantially as described.

5. A conduit comprising castings provided with hooks or ledges, a front secured along its width to the castings, a back secured at its top and bottom sides to the castings, a curved bottom also secured to the casting, standards secured to the bottom, sheaves carried by the standards, and a bracket arranged between the sheaves, substantially as described.

6. A conduit for electrical conductors comprising a shell or casing and reinforcing-brackets, means for supporting the cables within the casing, and manholes at intervals along the casing, substantially as described.

7. A conduit for electrical conductors comprising a shell or casing, castings to which the casing is secured, cable-supporting hooks or ledges carried by the castings, and sheaves arranged within the casing, substantially as described.

8. In electrical conduits, casings arranged on each side of a street, hook-carrying castings to which the casings are secured, transverse conduits connecting the said casings, and sheaves arranged within the said casings and conduits, substantially as described.

In testimony whereof I affix my signature in presence of two witnesses.

MERTIE ONG SPRING.

Witnesses:
R. G. DYRENFORTH,
R. M. ELLIOTT.